United States Patent [19]

Chandonnet et al.

[11] Patent Number: 5,444,723
[45] Date of Patent: Aug. 22, 1995

[54] OPTICAL SWITCH AND Q-SWITCHED LASER

[75] Inventors: Alain Chandonnet, Cap-Rouge; Gilles Larose, Quebec, both of Canada

[73] Assignee: Institut National d'Optique, Sainte-Foy, Canada

[21] Appl. No.: 111,697

[22] Filed: Aug. 18, 1993

[51] Int. Cl.$^6$ .............................................. H01S 3/121
[52] U.S. Cl. ...................................... 372/14; 372/10; 385/13; 385/140
[58] Field of Search ....................... 372/10, 14, 108, 6; 385/13, 140

[56] References Cited

U.S. PATENT DOCUMENTS

| | | | |
|---|---|---|---|
| 4,675,500 | 6/1987 | Kunz et al. | 372/103 |
| 4,822,125 | 4/1989 | Beals et al. | 372/140 |
| 4,955,034 | 9/1990 | Scerbak | 372/99 |
| 5,272,513 | 12/1993 | Vahala et al. | |

FOREIGN PATENT DOCUMENTS

2613844  10/1988  France ................................ 385/140

OTHER PUBLICATIONS

Bergh, et al., "Single-Mode Fibre Optic Directional Coupler", *Electronics Letters*, vol. 16, No. 7, 27 Mar. 1980, pp. 260–261.

Parriaux, et al., "Distributed Coupling on Polished Single-Mode Optical Fibers", *Applied Optics*, vol. 20, No. 14, 15 Jul. 1981, pp. 2420–2423.

Berthou, et al., "Switching Characteristics of a Piezoelectrical Actuated Evanescent-Wave Directional Coupler", *Electronic Letters*, vol. 23, No. 9, 23 Apr. 1987, pp. 469–471.

Zurn, et al., "Elasto-Optic Loss Modulation on Side—Polished Fibre", *Electronics Letters*, vol. 24, No. 14, 7 Jul. 1988, pp. 829–830.

Markatos, et al., "Optical Fibre Switch", SPIE vol. 798, *Fiber Optic Sensors II*, 1987, pp. 376–380.

Chandonnet, et al., "High-Power Q-Switched Erbium Fiber Laser Using an All-Fiber Intensity Modulator", *Optical Engineering*, vol. 32, No. 9, Sep. 1993, pp. 2031–2035.

Chandonnet, et al., "All-Fibre Intensity Modulator for Q-Switching", SPIE vol. 2041, *Mode-Locked and Solid State Lasers, Amplifiers, and Applications*, 17–19 Aug. 1993, pp. 282–290.

*Primary Examiner*—Rodney B. Bovernick
*Assistant Examiner*—Robert McNutt
*Attorney, Agent, or Firm*—Merchant, Gould, Smith, Edell, Welter & Schmidt

[57] ABSTRACT

A length of an optical fiber having a core and a surrounding cladding is held by a block with a portion of said length having substantially all of its cladding removed on one side of the portion and being exposed, and an index overlay perturbation pad is mounted near and substantially parallel to the portion. A translator moves the pad between a first position in which the pad is sufficiently remote from the portion to allow total internal reflection in the portion and a second position in which the pad is sufficiently close to the portion to allow light to escape from the core. The pad may be made of a metal for polarized modulation, or of a dielectric for unpolarized modulation. The optical switch provides very fast switching for a Q-switched fiber laser.

18 Claims, 4 Drawing Sheets

OPTICAL SWITCH AND Q-SWITCHED LASER

FIELD OF THE INVENTION

The present invention relates to an optical switch or intensity modulator for wave guides or optical fibers. The invention relates further to a modulated laser, also known as a Q-switched laser.

BACKGROUND OF THE INVENTION

One class of optical intensity modulators or switches for fiber optics is the side-polished coupler. See 'Single-Mode Fibre Optic Directional Coupler' (Electronics Letters, Mar. 27, 1980, Vol. 16 No. 7, p. 260), 'Distributed coupling on Polished Single-Mode Optical Fibers' (Applied Optics, Jul. 15, 1981, Vol. 20 No. 14, p. 2420). When a substantial portion of the cladding of an optical fiber has been removed, the associated perturbation of the refraction index gradient makes it possible, under some conditions, for light propagating in the core of the fiber to escape. A side-polished coupler includes an optical fiber with a substantial part of its cladding removed on one side in a region where it is embedded in a supporting block. Coupling of the light between the otherwise normally guided modes of the fiber and the outside of the fiber is carried out by changing the index of refraction of the medium surrounding the region.

A directional coupler is the fiber optic analogue to the beam splitter. It allows, among other things, part of the light propagating in one fiber to be routed into another fiber. In 'Switching Characteristics of a Piezoelectric Actuated Evanescent-Wave Directional Coupler' (Electronic Letters, Apr. 23, 1987, Vol. 23 No. 9, p. 469), a switch is built from a directional coupler made by joining side by side two side-polished couplers. Coupling between the two fibers then varies with the physical separation between the two side-polished couplers. In the reported device, a piezoelectric translator is provided to move one side-polished coupler back and forth relative to the other, thus allowing the passage of light to switch from one fiber to the other.

In 'Elasto-Optic Loss Modulation On Side-Polished Fibre' (Electronic Letters, Jul. 7, 1988, Vol. 24 No. 14, p. 829), pressure applied on the surface of the side-polished coupler locally increases the index of refraction of the fiber, thus effectively creating a channel through which light can escape from the core of the fiber. Means to modulate the controlling pressure with a piezoelectric translator are again provided.

In 'Optical Fibre Switch', SPIE Vol. 798 Fibre Optic Sensors II (1987) p. 376), a side-polished coupler is immersed in oil whose refractive index at ambient temperature is slightly above the effective refractive index of some or all guided modes of the fiber. In such conditions, it can be shown that the affected modes are no longer guided and can effectively escape. Means are provided to heat locally the oil in the region close to the core of the fiber where light is normally guided. Since liquids in general have relatively high and negative refractive index thermal coefficients, it is possible through heating to reduce the refractive index of the liquid in this sensitive region below the effective refractive index of the guided modes, thus effectively re-creating the normal fiber guiding conditions so that light may no longer be coupled out.

In all the devices considered above, switching speed is not very high since they depend on intrinsically slow mechanical or thermal effects to operate. High switching speed is, however, essential to Q-switch lasers and produce short giant light pulses, which is an important application of the present invention.

SUMMARY OF THE INVENTION

It is accordingly the object of the present invention to provide an integrated optical switch for optical fibers which is suitable to serve as a Q-switch for fiber lasers.

It is accordingly an object of the present invention to provide an optical switch for an optical fiber which is capable of a high switching speed and does not require propagating the light outside the optical fiber. It is another object of the present invention to provide a Q-switched laser capable of emitting a short duration, high intensity pulse.

According to the invention, there is provided an optical switch comprising means for holding a length of an optical fiber having a core and a surrounding cladding, with a portion of the length having substantially all of its cladding removed on one side of the portion and being exposed; an index overlay perturbation pad; and means for mounting the pad near and substantially parallel to the portion, the mounting means including means for translating the pad between a first position in which the pad is sufficiently remote from the portion to allow total internal reflection in the portion and a second position in which the pad is sufficiently close to the portion to allow light to escape from the core.

According to the invention, there is also provided a Q-switched laser comprising a small cross-section resonant cavity laser medium having a higher index of refraction than a material surrounding the cavity medium, lateral reflectivity of the cavity being provided by internal reflection, a portion of the medium having substantially all of its surrounding material removed on one side of the portion; a pumping light source coupled with the cavity medium to inject light along the medium; an index overlay perturbation pad; means for mounting the pad near and substantially parallel to the portion, the mounting means including means for translating the pad between a first position in which the pad is sufficiently remote from the portion to allow internal reflection in the portion and a second position in which the pad is sufficiently close to the portion to allow light to escape from the medium.

BRIEF DESCRIPTION OF THE DRAWINGS

The invention will be better understood by way of the following description of an embodiment of the invention with reference to the appended drawing, in which.

DETAILED DESCRIPTION OF THE PREFERRED EMBODIMENT

Figure 1:
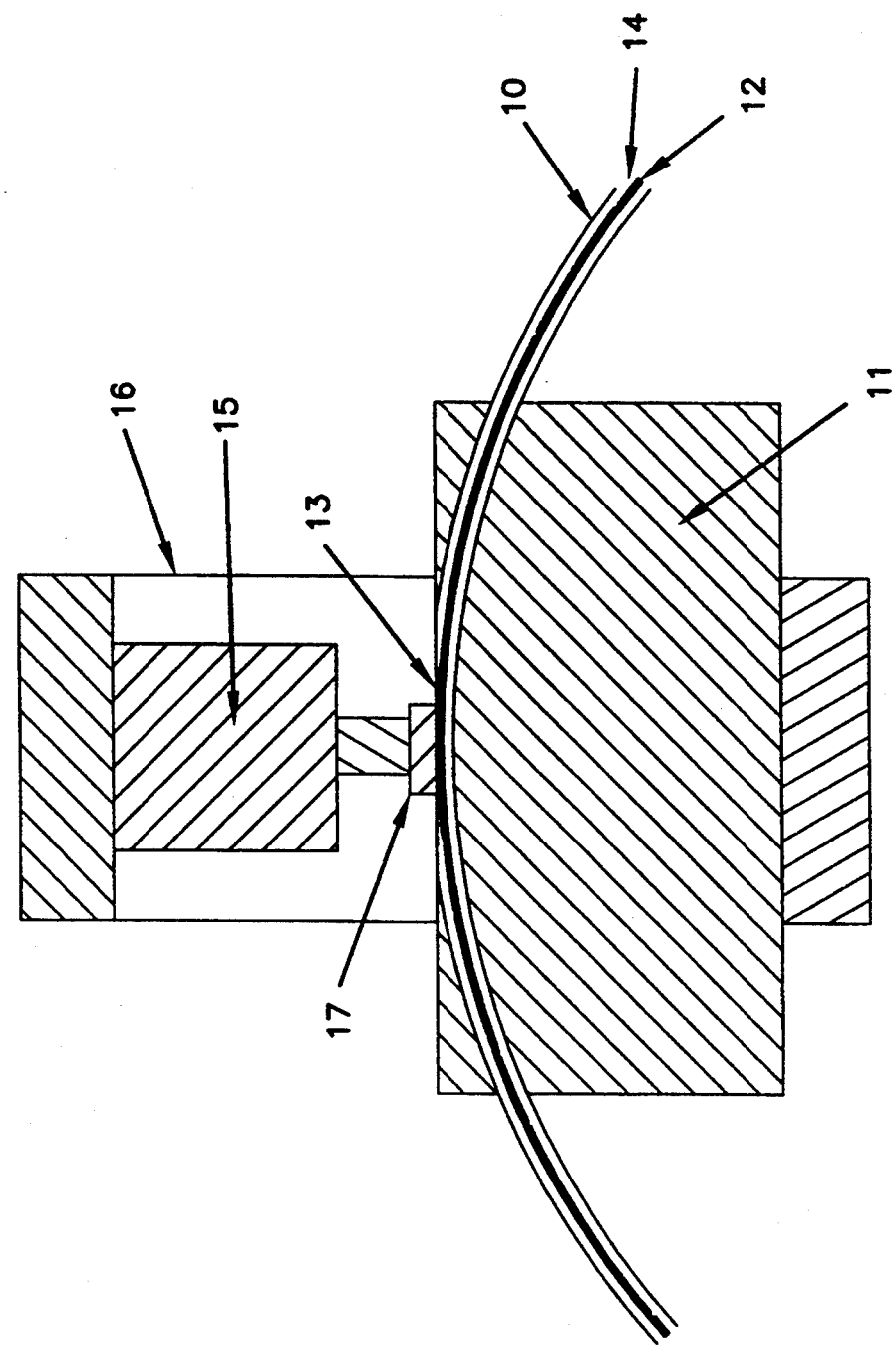
FIG. 1 is a detailed side cross-sectional view of the optical switch according to the preferred embodiment.
Figure 2:
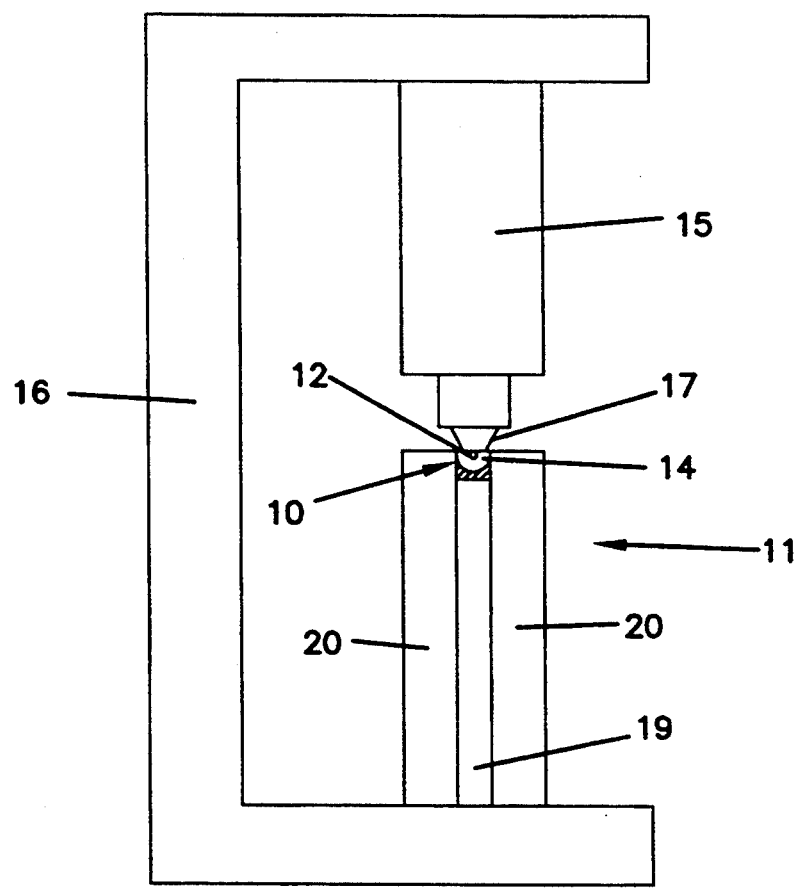
FIG. 2 is a detailed end cross-sectional view of the optical switch of FIG. 1.

FIGS. 1 and 2 show the optical switch which acts on an optical fiber (10) which can be single mode or multimode, doped (e.g. with rare-earth elements) or undoped. The fiber (10) is embedded in a holding block (11) in a slightly curved fashion in order to expose its core (12) on a side portion (13). Block (11) comprises a middle glass plate (19) having a thickness equal to the fiber (10) (125 μm) and a radius of curvature of 25 cm, and two outer glass plates (20) between which the middle plate is sandwiched. The glass plates (19,20) are glued together and the resulting block (11) is polished flat. The block (11) is polished until most of the fiber's cladding (14) that lies over the core (12) in the portion (13) is removed and transmission through the fiber can be interrupted by placing a medium with a higher index of refraction on the polished region. This part of the switch is known as the side-polished coupler. High single pass attenuation is desirable, i.e. >40 dB. In the absence of the overlay medium (17), very small excess loss is desirable, i.e. <0.2 dB. It may even be possible to go a little further in the polishing process and remove some of the core material, as long as there remains enough core material to ensure continued propagation of the light with minimal acceptable loss when only air surrounds the coupler.

In one example, the fiber (10) has a core diameter of 3.6 μm, a cladding diameter of 125 μm, a core index of 1.4600, a cladding index of 1.4475, a pumping light wavelength of 980 nm, an overlay medium (17) index of 1.500, and a residual cladding thickness of 1.0 μm. The medium (17) is a small Plexiglas (TM) rod 2 mm in diameter and 4 mm long. The tip of the rod is machined to make a pyramid shaped bottom surface 0.2 mm by 1.3 mm. The bottom surface can be the original flat surface of the Plexiglas sheet. The piece is glued in place in a hole drilled in a screw which can be secured on the piezoelectric translator's head (15). The bottom length of pad (17) is usually at least 100 times the diameter of core (12), and preferably about 400 times the diameter.

A fast piezoelectric translator (15) such as a Physik Instrumente GmbH & Co. model P-244.1 is held in place over the side-polished coupler with a bracket (16) including a 5-axis positioner. An overlay index perturbation pad (17) is attached to the head of the piezoelectric translator (15) as mentioned above and can be moved by the piezoelectric translator (15) between a first position where the pad (17) is in contact with the portion (13) and another position where the pad (17) is sufficiently far away from the portion (13) that it no longer perturbs light propagating in the fiber (10). For the switch to perform well, it is essential that the pad (17) and the portion (13)'s surfaces perfectly match together so that the perturbation caused by pad (17) of the portion (13) takes place evenly along its length as the pad (17) is moved by the translator (15). In other words, the pad (17) and the portion (13) should lie evenly and parallel on top of one another. For this purpose, visual feedback can be used to perform the angular alignment by looking into a microscope placed in such a way that the contact area can be seen through a side face of the coupler. Internal reflection of the illuminating light coming at large incidence angles at the interface is prevented only where there is contact. When angular and lateral alignment is completed, spacing between the pad and the coupler is adjusted to allow contact at a predetermined voltage on the piezoelectric translator.

The electronic circuitry (not shown) conventionally used to charge and discharge the piezoelectric translator (15) must operate at fast transition and repetition rates, the piezoelectric translator (15) being able to withstand the corresponding induced accelerations. The translator used has a 10 μm expansion at 1000 V, 66 N/μm stiffness, 24 nF electrical capacitance and a 16 kHz resonant frequency. The threshold voltage is the voltage at which the pad (17) comes into contact with the portion (13) and is set initially to 500 V. Discharge of the translator (15) is done quickly through a small resistance of about 100 ohms and a transistor which is gated for a short period time to just break contact between the pad (17) and the portion (13). It appears that surface adhesion between the pad and the portion improves the speed of the contact break.

Charging of the translator (15) can be done through a larger resistance, e.g. 280 k ohms, until feedback indicates that the light transmission in the fiber (10) is attenuated due to pad (17). Feedback can be provided by a photodetector measuring the amount of remaining pumping or other probe light leaving the fiber. With feedback, the speed at which the translator is charged can be rapid until some attenuation is detected, after which charging can be continued at a slower rate until attenuation has reached a level corresponding to good contact.

In the preferred embodiment, pad (17) is made of a dielectric material (acrylic or Plexiglas (TM)). It is essentially a bulk slab and may include a thin buffer coating. The buffer coating may improve the mechanical properties or the manufacturing process of the switch. The material of pad (17) could also be dichroic, i.e. the optical properties of the dielectric material could be such that its refractive index is greater than the effective refractive index of the propagating fiber modes at wavelength $\lambda_l$ and, at the same time, its refractive index is smaller than the effective refractive index at wavelength $\lambda_p$. In this case, the optical switch will effectively allow switching of light at wavelength $\lambda_l$ but it will be totally transparent and ineffective at wavelength $\lambda_p$, regardless of the position of the pad (17). Such an optical switch is useful in building a Q-switch fiber laser (laser wavelength $\lambda_l$) with the pump light (wavelength $\lambda_p$) unaffected by the switch.

Figure 3:
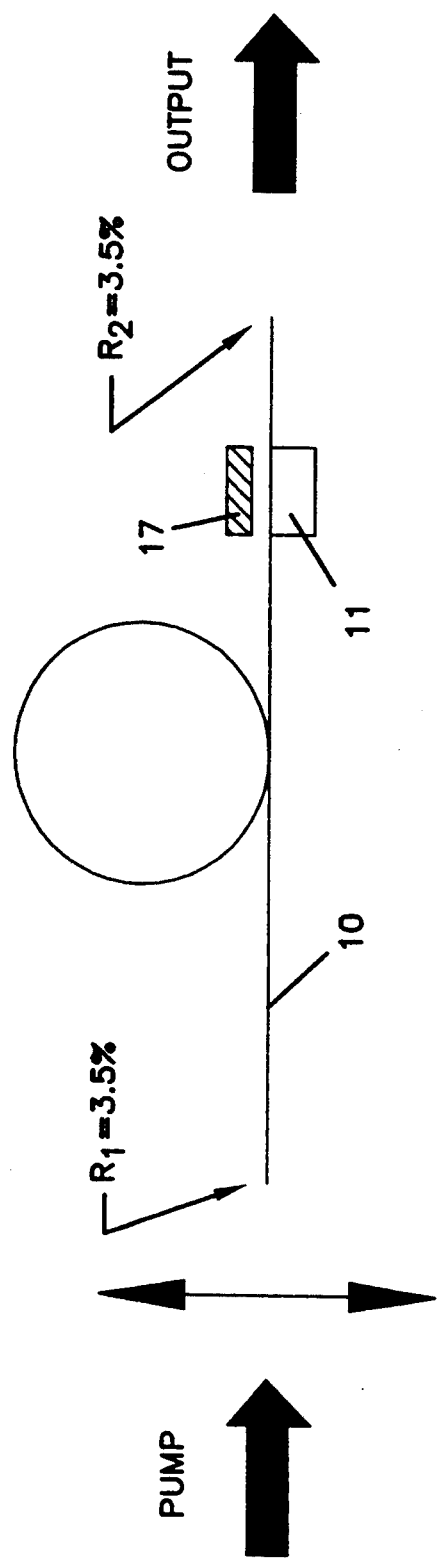
FIG. 3 is a schematic side view of a Q-switched laser including the optical switch according to the preferred embodiment.
Figure 4:
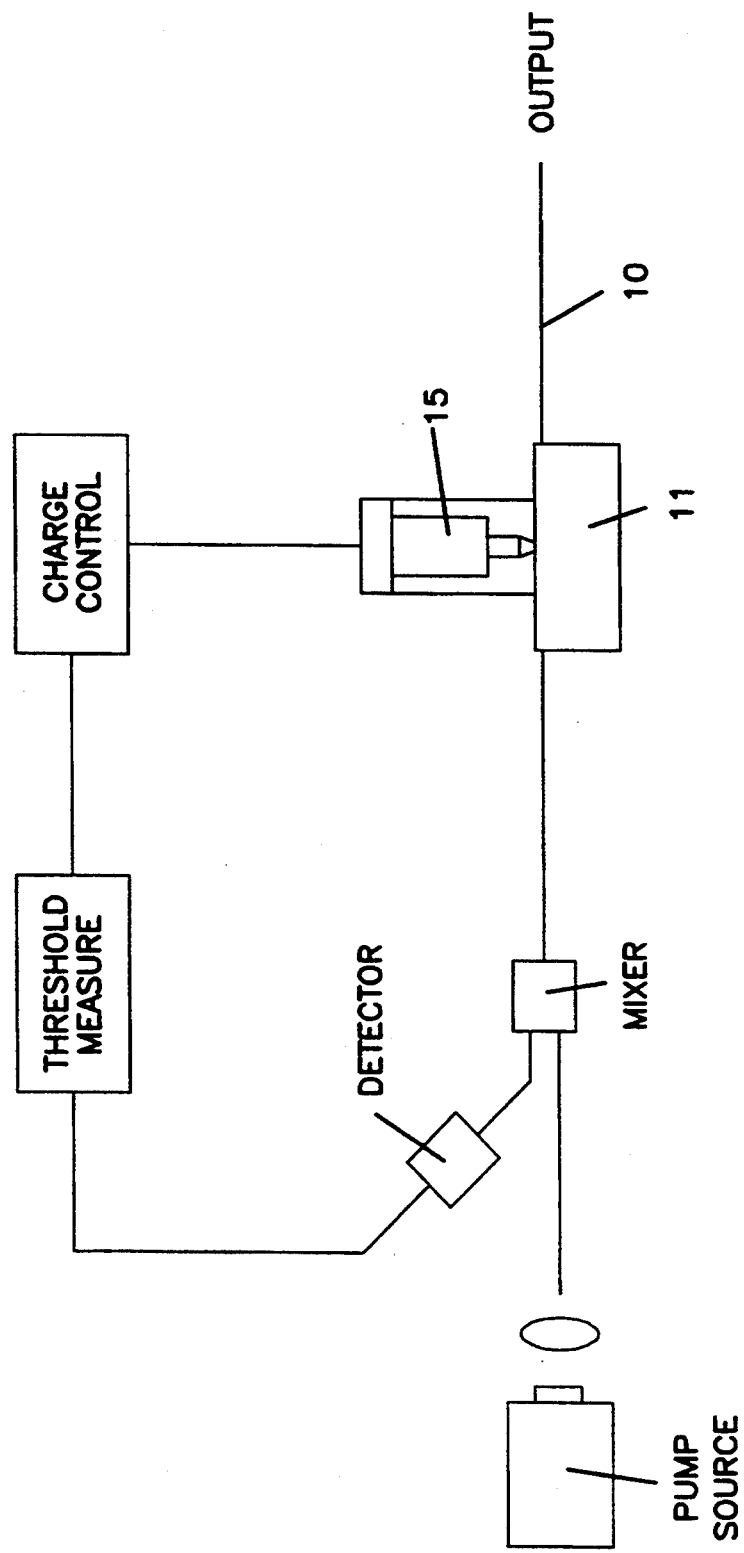
FIG. 4 is a block diagram of the Q-switched laser including the optical switch according to the preferred embodiment.

In the case of the fiber laser shown in FIG. 3, the fiber (10) is an erbium doped fiber. The core has a numerical aperture of NA=0.19, a diameter is 3.6 μm, a cutoff wavelength of 860 nm, and an unconfined erbium concentration of 4370 ppm resulting in a 23 dB/m small-signal absorption at 980 nm. At one end of the fiber laser cavity, exposure to coherent UV light through a phase mask provides minor periodic variations in the refractive index over a few mm by interaction of the UV light with trace quantities of Ge occuring in the core material which will create a Bragg diffraction grating which is a dichroic mirror reflecting the laser light while allowing the pumping light to pass therethrough. The pumping light can come from a laser diode or a Ti:sapphire laser. From the 1.25 m fiber, tests have produced 6 μJ pulses as short as 9 ns. The resonant cavity can also be formed by Fresnel reflections occuring at the fiber end, although Fresnel reflection is not dichroic. Multilayered dielectric coatings can also provide appropriate mirrors.

In another embodiment of the invention, pad (17) is made of bulk metal. When it is in contact with the portion (13), the transverse electric modes of the light travelling in the core (12) are essentially not affected by the presence of the pad (17) but the transverse magnetic modes are strongly coupled to surface wave modes, known as plasmon polaritons, at the interface between the fiber (10) and metal pad (17). These plasmon waves are further rapidly absorbed by the metal, taking away the energy of the transverse magnetic modes propagating in the fiber (10). When the pad (17) is moved away from the portion (13), neither modes will see its propagation affected by the switch. Such an optical switch would therefore be polarization sensitive, acting only on the transverse magnetic modes of the fiber (10). A laser including such a switch would threrfore need an additional polarizer to eliminate the transverse electric modes.

As can be understood, the switch according to the invention is more suitable to undergo a fast transition from the off-state where it blocks the passage of light through the fiber (10) (pad (17) in contact with the portion (13)) to the on-state where it does not affect the passage of light (pad (17) away from the portion (13)), than from the on-state to the off-state. This is so because there is usually a practical limit as to just how fast the pad (17) can be moved back in contact with the fiber (10) without substantial risk of damaging the fiber (10) or the pad (17) itself. However, there is no such limit as to how fast the pad (17) can be moved away from the portion (13) and, to ensure the fastest switching speed in this respect, it is preferable to keep the mass of the pad (17) as well as that of the rest of the piezoelectric translator (15) head as small as possible. It is even possible to operate pad (17) in liquid. This would hardly affect switching speed as the pad (17) is moved away from portion (13) but would substantially reduce the maximum repetition rate at which the switch could operate since any fluid between pad (17) and portion (13) must be squeezed out of this region as pad (17) comes back in contact with portion (13). However, operating in liquid could reduce the risk of damage to pad (17) or portion (13) during operation of the switch.

As can be understood, in order to provide a switch with a high repetition rate as well as a rapid state transition time, pad (17) is made as small as suitably possible, and the translation means, such as piezoelectric element (15) is able to move pad (17) through a very short distance in a very short amount of time. Pad (17) operates preferably in air in order to avoid any fluid friction which could hinder its movement. As an alternative to a piezoelectric transducer, it would be possible to use other forms of transducers or translators such as a magnetostrictive or even electromagnetic transducer. The primary characteristic of the transducer to be used is that the displacement time between the first and second positions should be as rapid as required for rapid switching, and the transducer should move the pad such that it remains parallel to side surface portion (13) such that the perturbation of the refractive index gradient of core (12) takes place substantially evenly along the length of pad (17).

Although the invention has been described above with reference to an erbium doped monomode Q-switched laser, it is to be understood that the invention can also be used to provide a switch for a multimode fiber and for providing a Q-switched laser of any relatively small cross-section resonant cavity laser in which the laser medium makes use of internal reflection for lateral reflectivity, and with any suitable dopant to provide the desired active laser medium characteristics.

We claim:

1. An optical switch comprising:
   means for holding a length of an optical fiber having a core and a surrounding cladding, with a portion of said length having substantially all of its cladding removed on one side of said portion and being exposed, said means surrounding said length except on said one side;
   an index overlay perturbation pad substantially matching with said side of the portion;
   means for mounting the pad near and substantially parallel to said portion, said mounting means including means for translating said pad between a first position in which said pad is sufficiently remote from said portion to allow total internal reflection in said portion and a second position in which said pad is sufficiently close to said portion and is lying evenly and parallel on top of said portion to allow light to escape from said core; and
   wherein said pad is made of a dielectric having an index of refraction greater than an index of refraction of the core.

2. The optical switch according to claim 1, wherein said pad has a length between 100 and 1000 times a diameter of the core.

3. The optical switch according to claim 2, wherein said length is about 400 times a diameter of the core.

4. An optical switch comprising:
   means for holding a length of an optical fiber having a core and a surrounding cladding, with a portion of said length having substantially all of its cladding removed on one side of said portion and being exposed, said means surrounding said length except on said one side;
   an index overlay perturbation pad substantially matching with said side of the portion;
   means for mounting the pad near and substantially parallel to said portion, said mounting means including means for translating said pad between a first position in which said pad is sufficiently remote from said portion to allow total internal reflection in said portion and a second position in which said pad is sufficiently close to said portion and is lying evenly and parallel on top of said portion to allow light to escape from said core; and
   wherein said pad is a conductor, said optical switch providing control over the transverse magnetic mode of light passing through said optical fibre.

5. An optical switch comprising:
   means for holding a length of an optical fiber having a core and a surrounding cladding, with a portion of said length having substantially all of its cladding removed on one side of said portion and being exposed, said means surrounding said length except on said one side;
   an index overlay perturbation pad substantially matching with said side of the portion;
   means for mounting the pad near and substantially parallel to said portion, said mounting means including means for translating said pad between a first position in which said pad is sufficiently remote from said portion to allow total internal reflection in said portion and a second position in which said pad is sufficiently close to said portion and is lying evenly and parallel on top of said portion to allow light to escape from said core;
   wherein said means for translating comprise a piezoelectric translator;
   wherein said pad is made of a dielectric having an index of refraction greater than an index of refraction of the core; and wherein said second position is in contact with said portion, said translator being charged when said pad is in contact and discharged when said pad is in said first position.

6. The optical switch according to claim 5, further comprising means for rapidly discharging said translator and slowly recharging said translator.

7. The optical switch according to claim 5, further comprising feedback means including a light detector for detecting light travelling in said fiber and attenuated by said pad, and means for recharging said translator until attenuation has reached a predetermined complete level.

8. A Q-switched laser comprising:
a small cross-section resonant cavity including a laser medium, said cavity having a higher index of refraction than a material surrounding the cavity, lateral reflectivity of said cavity being provided by internal reflection, a portion of said cavity having substantially all of its surrounding material removed on one side of said portion;
a pumping light source coupled with the cavity to inject light along said cavity;
an index overlay perturbation pad substantially matching with said side of the portion;
means for mounting said pad near and substantially parallel to said portion, said mounting means including means for translating said pad between a first position in which said pad is sufficiently remote from said portion to allow internal reflection in said portion and a second position in which said pad is sufficiently close to said portion and is lying evenly and parallel on top of said portion to allow light to escape from said cavity; and
wherein said pad is made of a dielectric having an index of refraction greater than an index of refraction of said cavity.

9. Laser as claimed in claim 8, wherein said medium comprises a monomode doped optical fiber.

10. Laser as claimed in claim 9, wherein said optical fiber is erbium doped.

11. Laser according to claim 8, wherein said pad is made of a dielectric having an index of refraction greater than an index of refraction of said cavity.

12. Laser according to claim 8, wherein said pad is a conductor, said pad providing control over the transverse magnetic mode of light passing through said cavity, and further comprising a polarizer to eliminate transverse electric modes.

13. Laser according to claim 8, wherein said means for translating comprise a piezoelectric translator.

14. Laser according to claim 13, wherein said second position is in contact with said portion, said translator being charged when said pad is in contact and discharged when said pad is in said first position.

15. Laser according to claim 14, further comprising means for rapidly discharging said translator and slowly recharging said translator.

16. Laser according to claim 14, further comprising feedback means including a light detector for detecting light travelling in said fiber and attenuated by said pad, and means for recharging said translator until attenuation has reached a predetermined complete level.

17. A Q-switched laser comprising:
a small cross-section resonant cavity including a laser medium, said cavity having a higher index of refraction than a material surrounding the cavity, lateral reflectivity of said cavity being provided by internal reflection, a portion of said cavity having substantially all of its surrounding material removed on one side of said portion;
a pumping light source coupled with the cavity to inject light along said cavity;
an index overlay perturbation pad substantially matching with said side of the portion;
means for mounting said pad near and substantially parallel to said portion so that the pad and said side of the portion substantially match together, said mounting means including means for translating said pad between a first position in which said pad is sufficiently remote from said portion to allow internal reflection in said portion and a second position in which said pad is sufficiently close to said portion and is lying evenly and parallel on top of said portion to allow light to escape from said cavity; and
wherein said pad has an index of refraction lower than the index of refraction of said cavity at a wavelength of the pumping light, and an index of refraction higher than the index of refraction of said cavity at a wavelength of laser light of said medium.

18. Laser as claimed in claim 17, wherein said pad is provided near a middle of said cavity.

* * * * *